Figure 1:
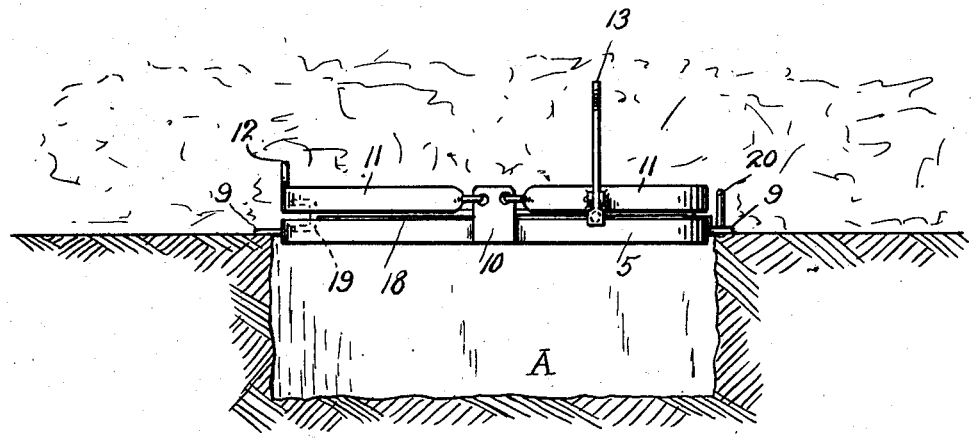

Feb. 4, 1930.                 M. DI FILIPPO                 1,745,666
                               ANIMAL TRAP
                          Filed March 17, 1928    3 Sheets-Sheet 1

Inventor
Massimo DiFilippo

By *Clarence A O'Brien*
                    Attorney

Feb. 4, 1930.   M. DI FILIPPO   1,745,666
ANIMAL TRAP
Filed March 17, 1928   3 Sheets-Sheet 2

Inventor
Massimo DiFilippo

By Clarence A. O'Brien
Attorney

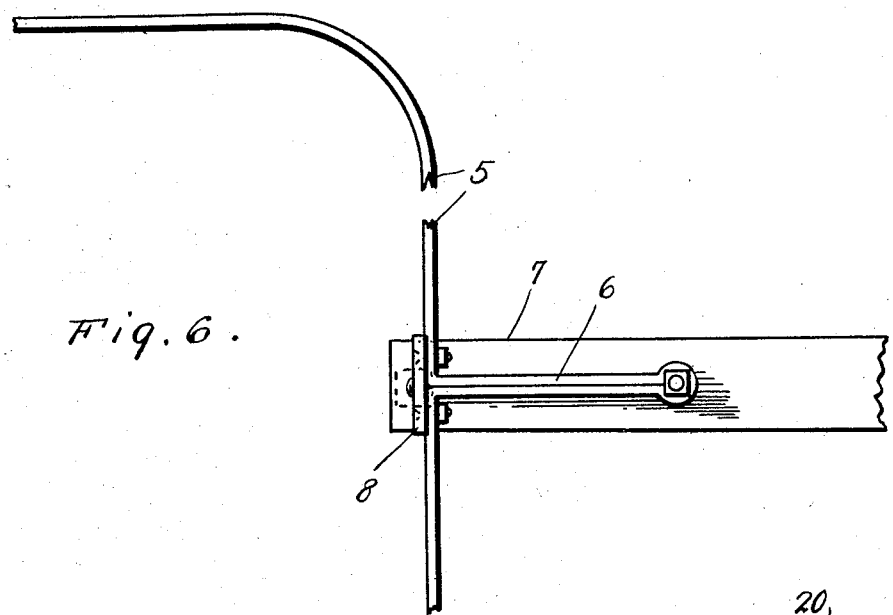
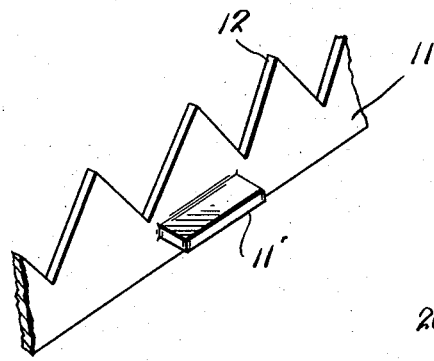
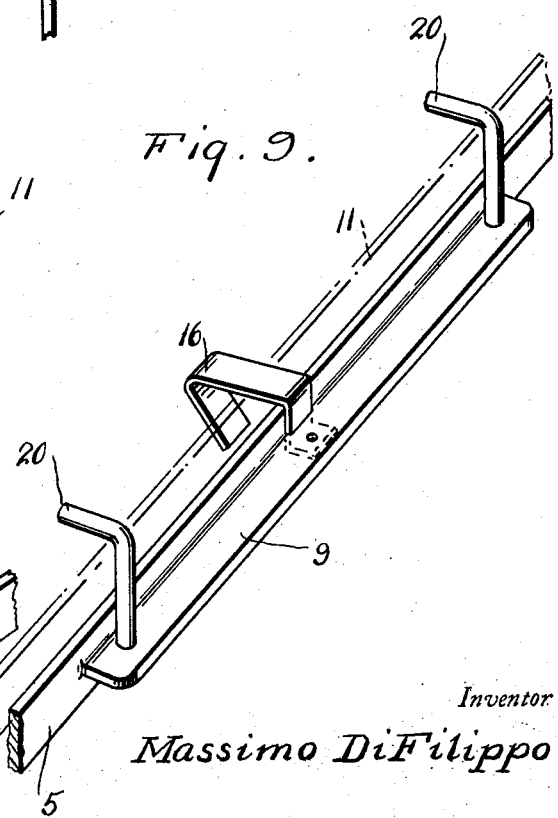
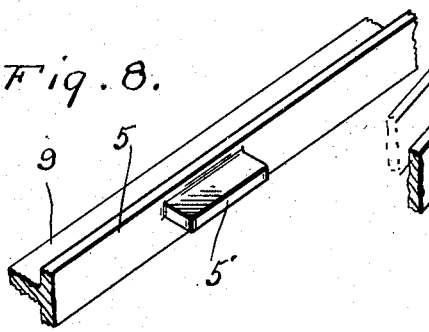

Patented Feb. 4, 1930

1,745,666

UNITED STATES PATENT OFFICE

MASSIMO DI FILIPPO, OF NOKESVILLE, VIRGINIA

ANIMAL TRAP

Application filed March 17, 1928. Serial No. 262,454.

This invention relates to new and useful improvements in animal traps of the complementary pivotal jaw variety normally actuated to a closed position by the usual leaf spring, the invention aiming to provide a trip plate of relatively large area for maintaining the jaws in open position against the action of the spring so that an animal stepping at any part between the jaws will cause the releasing of the jaws so that the leaf spring will come into play from a rapid closing of the jaws.

Furthermore means is provided for automatically locking the jaws in swung position so that they cannot be separated by the animal in attempting to extricate himself.

A further and highly important feature of this invention resides in the provision of means associated with the trap frame whereby the jaws may be maintained in open position during the arrangement of the trip plate in association with the jaws so that the trap may be set without danger to the trapper.

With the foregoing and other objects in view as the nature of the invention will be better understood, the same comprises the novel form, combination and arrangement of parts hereinafter more fully described, shown in the accompanying drawings and claimed.

In the drawings wherein like reference characters indicate corresponding parts throughout the several views:—

Figure 4:
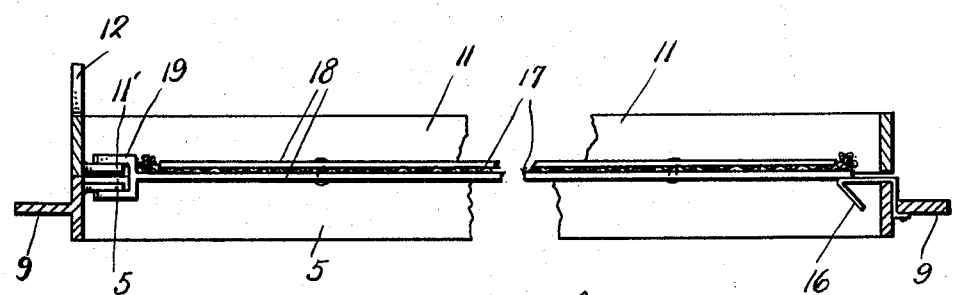
Figure 5:
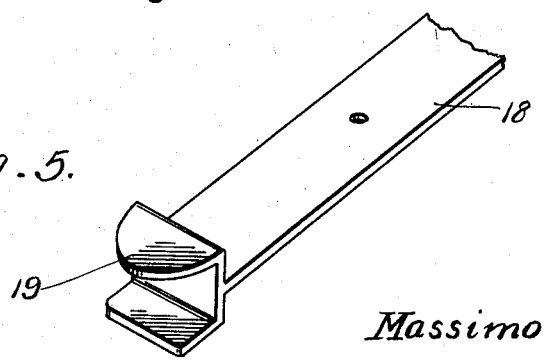
Figure 2:
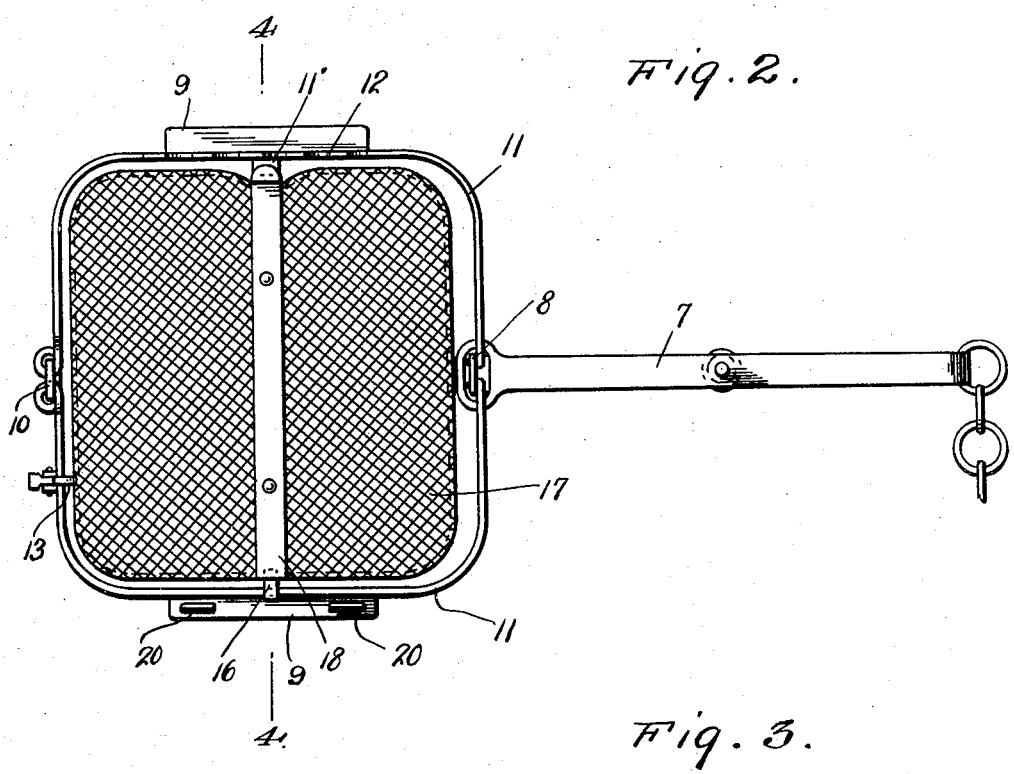
Figure 3:
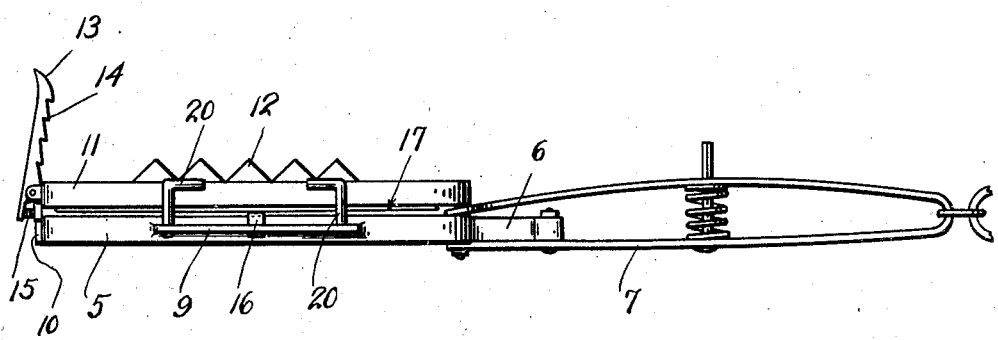

Figure 1 is an end elevation of my improved trap illustrated as disposed in position over a pit formed in the earth which will enable the trip plate to fall therein so that the jaws will quickly move to closed position when the plate is released by an animal stepping thereon, Figure 2 is a top plan view of the trap in set position, Figure 3 is an edge elevation, Figure 4 is a detail transverse section taken through the trap substantially upon the line 4—4 of Figure 2, Figure 5 is an end perspective of a cross member associated with the trip plate, and constructed at this end for engagement with one of the jaws on the trap frame for maintaining the jaws in set position, Figure 6 is a fragmentary plan view of the trap frame and the lower leaf of the jaw actuating spring disclosing the manner of association of the frame with the spring, Figure 7 is a fragmentary perspective showing the saw-tooth edge of one of the trap jaws, Figure 8 is a similar view of the adjacent side of the trap frame, and Figure 9 is a similar view of the opposite side of the frame.

Now having particular reference to the drawings, my novel trap consists of a substantially rectangular open frame 5 of metallic strapping. One side of this metallic frame 5 is formed intermediate its ends with an outwardly extending longitudinal portion 6 for arrangement upon the lower leaf of the conventional integral double leaf spring 7, the inner end of this leaf being formed with an upstanding lug 8 that is bolted to the frame 5 as clearly disclosed in Figure 6.

The opposite sides of this frame 5 are formed with outwardly projecting longitudinally extending ribs 9—9 for engagement upon the earth's surface at opposite sides of a pit A over which the trap is to be arranged as disclosed in Figure 1.

The side of the frame opposite to that to which the spring 7 is attached is provided with an upwardly extending plate 10 in line with the said lug 8 while pivoted to these plates are the ends of the side legs of a pair of complemental jaw members 11—11 preferably of the U-formation disclosed in Figure 2. Intermediate the side legs one of the jaw members is formed at its upper edge with saw teeth 12 for biting into the leg of the animal trapped between the jaws when the same are sprung. Pivoted to the outermost leg of one of the jaw members 11 is an upwardly extending latch lever 13 having teeth 14 upon its inner edge there being arranged between this lever and the jaw 11 beneath the pivotal connection an expansible coil spring 15 for normally swinging the inner end of the lever inwardly so that the same will engage with the adjacent portion of the opposite jaw when the jaws are sprung for locking the jaws together to prevent the opening of the same by the animal in attempting to extricate himself.

The inner surface of the intermediate portion of one of the jaws 11 as well as the inner surface of the adjacent side of the frame 5 are formed with inwardly extending lug plates 11′ and 5′ respectively while associated with the frame 5 at the opposite side thereof is an inwardly extending leaf spring 16. The invention further includes a rectangular shaped trip plate 17 of an area but slightly less than the area of the frame 5 so that when the same is disposed within the frame there will be but little space between the edge of the trip plate and the interior of the frame as disclosed in Figure 2. The center of this trip plate 17 is reinforced by a pair of metallic cross straps 18—18 arranged upon the top and bottom sides of the trip plate and interconnected by rivets as in Figure 4. The end of the lowermost strap 18 adjacent the lug plates 5′ and 11′ is formed with a fork 19 for engagement over the lug plates 5′ and 11′ of the frame and jaw respectively when the jaws have been moved to open position against the action of the spring 7. The opposite end of this lower strap 18 is adapted to be supported upon the inner end of the frame spring 16 so as to maintain the trip plate in relatively horizontal position so as to lock the jaws in set position.

However, should an animal step upon any point of the trip plate 17 the spring 16 will bend downwardly resulting in the dropping of the trip plate 17 and the consequent releasing of the jaws whereupon they will be thrown to closed position by the action of said spring 7.

In order to facilitate the association of the trip plate 17 with the frame and the jaws the rib 9 of the frame 5 remote from the jaw formed with the saw teeth 12 has loosely associated therewith a pair of upstanding L-shaped latch hooks 20—20 the right angularly bent upper ends of which are adapted to be swung inwardly into position over the adjacent jaw when the spring 7 has been collapsed and the jaws moved to open position. After the trip plate 17 has been arranged in locking position these latch hooks are rotated out of engagement with the jaw as disclosed in Figure 1.

In view of the foregoing description when considered in conjunction with the accompanying drawings it will be apparent that I have provided a highly novel, simple and extremely useful animal trap that is well adapted for all of the purposes heretofore designated and even though I have herein shown and described the invention as consisting of certain detail structural elements it is nevertheless to be understood that some changes may be made therein without affecting the spirit and scope of the appended claim.

Having thus described my invention, what I claim is:—

In a trap of the class described, a frame, a spring unit associated with the frame, a pair of complementary members pivoted to the frame and adapted to be normally moved to a closed position by the action of the spring unit, a trip plate for arrangement within the frame, one of the jaw members and the adjacent side of the frame being formed with alined inwardly extending lugs, an elongated strip secured on the trip plate, the ends thereof projecting beyond the respective sides of the trip plate, a fork arranged on one end of the strip for embracing the lugs, and an inwardly extending leaf spring carried by the opposite side of the frame and upon which the other end of the strip is adapted to rest whereby the jaws are held in an opened position.

In testimony whereof I affix my signature.

MASSIMO DI FILIPPO.